United States Patent [19]
van der Lely et al.

[11] 3,992,862
[45] Nov. 23, 1976

[54] HAYMAKING MACHINES

[76] Inventors: Cornelis van der Lely, Bruschenrain 7, Zug, Switzerland; Ary van der Lely, 10, Weverskade, Maasland, Netherlands

[22] Filed: Oct. 11, 1974

[21] Appl. No.: 514,310

[30] Foreign Application Priority Data
Feb. 18, 1974 Netherlands.................... 7402172
Apr. 22, 1974 Netherlands.................... 7405406

[52] U.S. Cl. ............................................. 56/370
[51] Int. Cl.² ...................................... A01D 79/02
[58] Field of Search ............. 56/370, 377, 365, 368

[56] References Cited
UNITED STATES PATENTS
3,579,972   5/1971   Sears................................... 56/370

FOREIGN PATENTS OR APPLICATIONS
80,473      3/1963    France.................... 56/370
1,387,449   12/1964   France.................... 56/370
937,677     1/1956    Germany................... 56/370
6,512,295   3/1967    Netherlands.............. 56/370
439,844     12/1967   Switzerland.............. 56/370
1,118,209   6/1958    United Kingdom........... 56/370

*Primary Examiner*—J.N. Eskovitz
*Attorney, Agent, or Firm*—Mason, Mason & Albright

[57] ABSTRACT

A hay making machine has a rake that rotates on an upwardly extending axis and an outer circumference defined by a felly or rim to which elongated crop working elements are connected. The elements can be tines or flexible strips that are pivotally or flexibly associated with the felly or rim so that the elements respond to ground undulations or a control device and pivot or otherwise deflect. In one aspect, tines having supporting portions integral with outer bent end portions are spaced from adjacent tines a distance (between corresponding points) less than the combined length of the two aforementioned tine portions to ensure that crop is retained during rotation of the rake member. Alternate tines may have different lengths or the tines may have plates to facilitate crop retention. A wire or rope can be connected to the tines above their outer ends to enhance their crop working cooperation or the tines can be interconnected by tortional rod portions and/or loops that are integral for the same effect. Also, the felly can be formed by the bottom of a walled rim of the rake. A control member in the form of a blower mounted within a housing at the rake's hub can be used to direct an air stream at crop held by the crop working elements to dislodge the crop at a preselected sector around the rake member's circumference. Wires interconnecting the hub to the elements in the form of flexible strips can be tripped by a roller positioned to contact the wires and distort the strips so that crop is dropped at a preselected sector. One or more swath forming members can be positioned above and/or laterally of the rake member to direct deposited crop.

44 Claims, 21 Drawing Figures

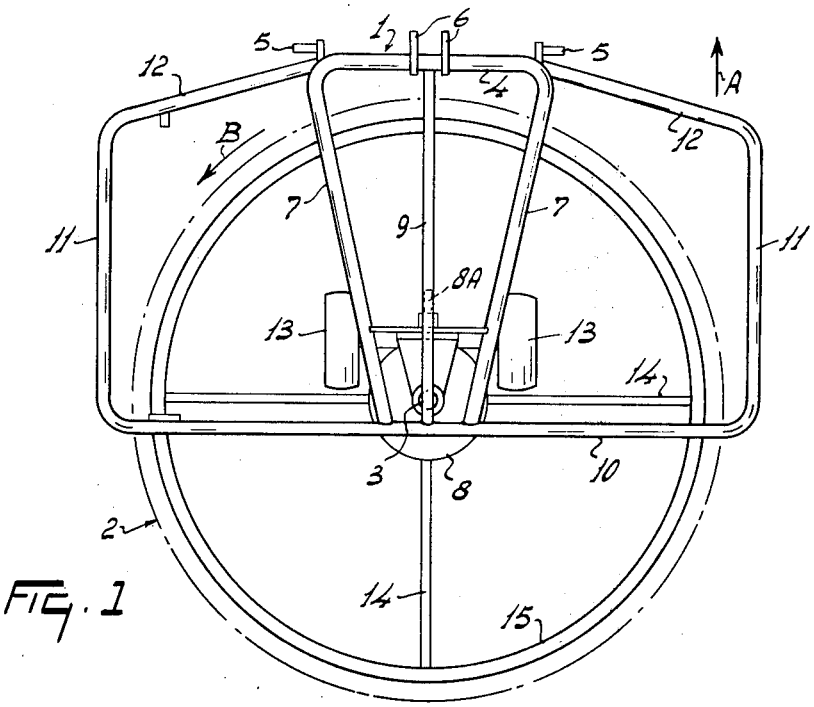
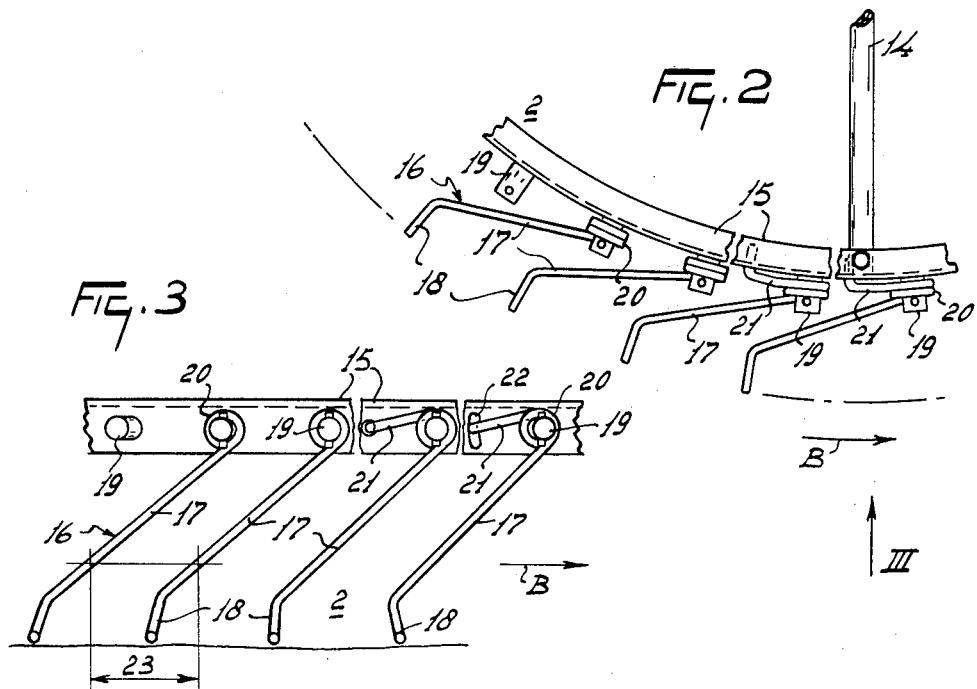

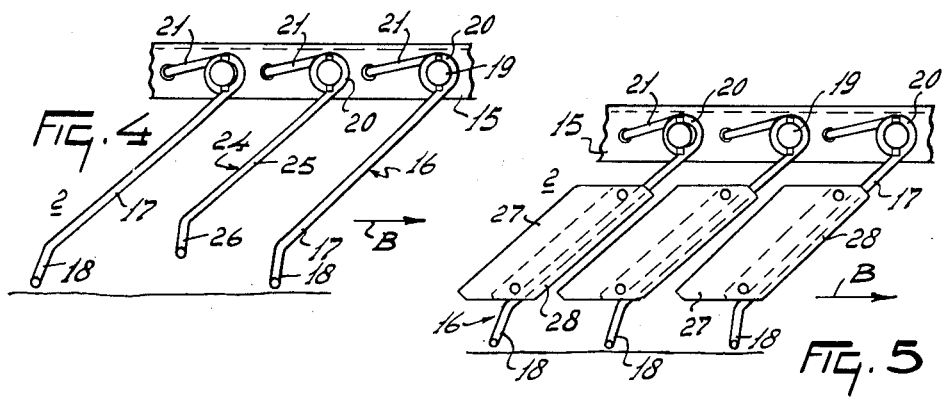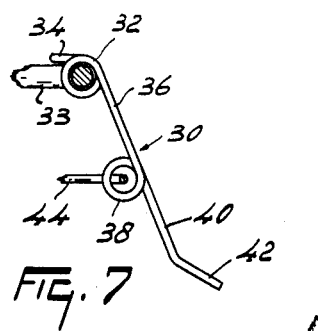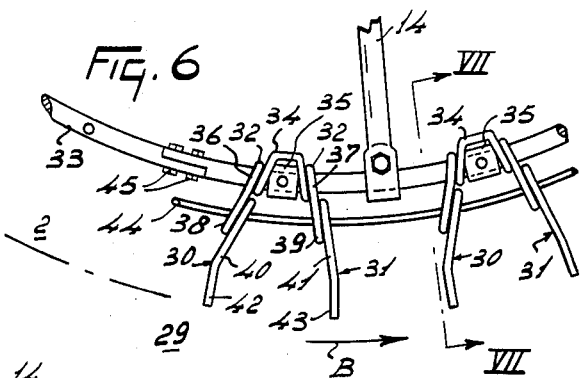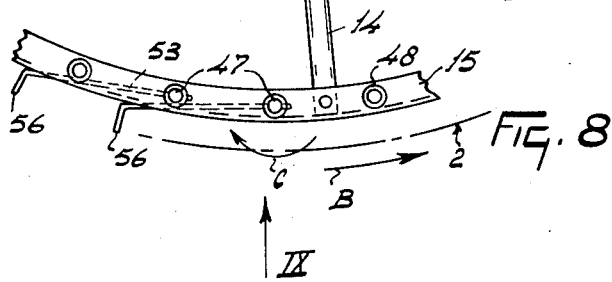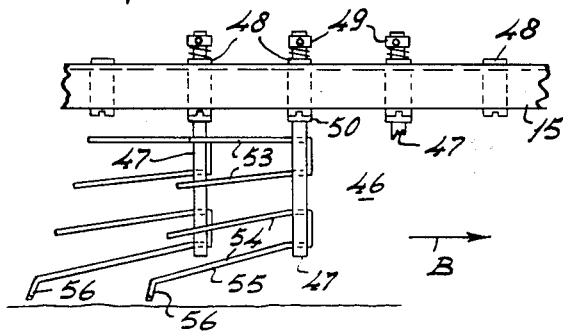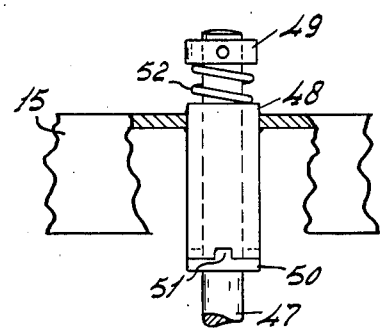

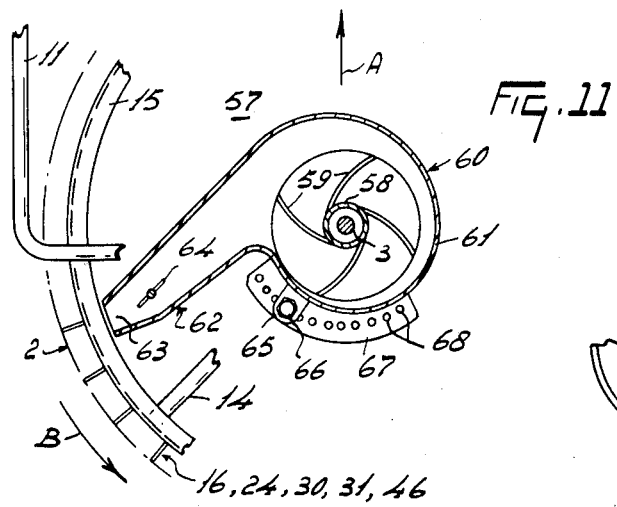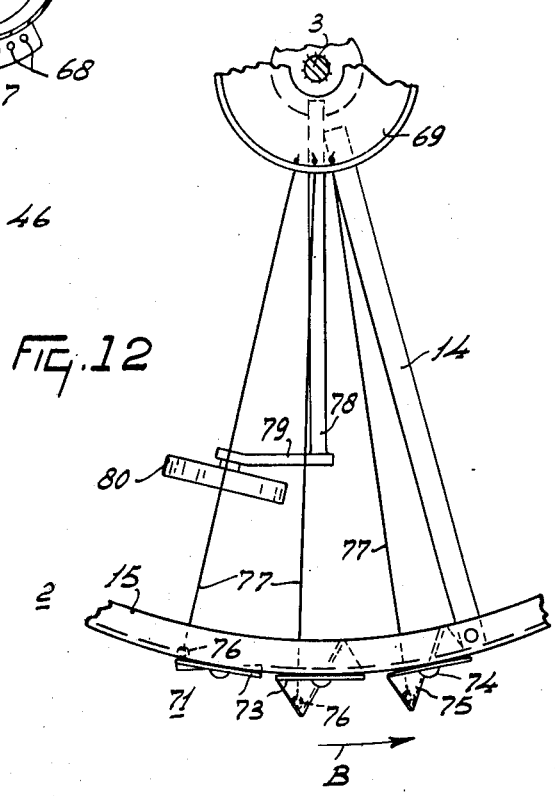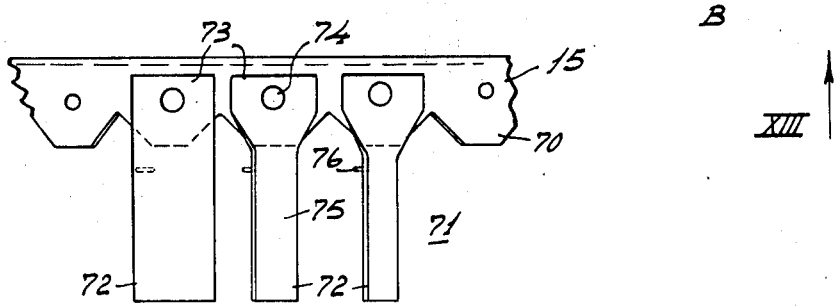

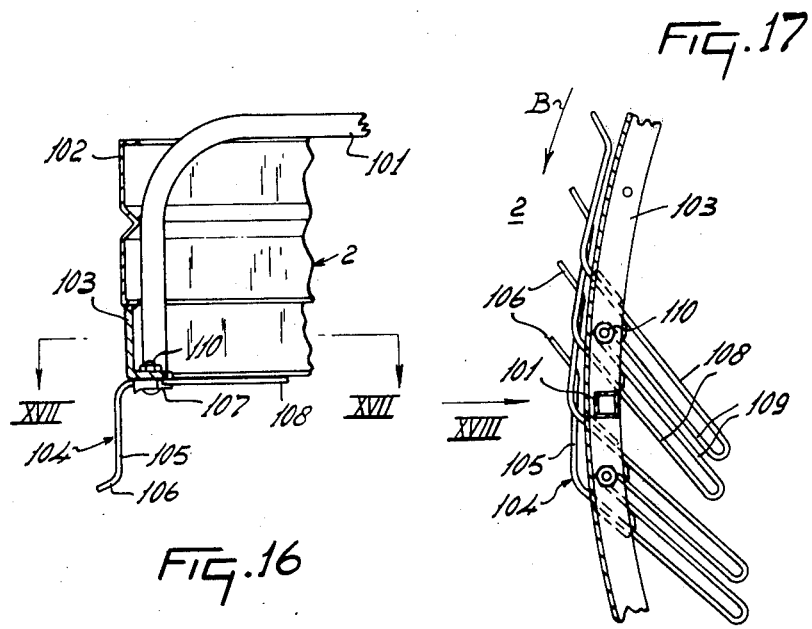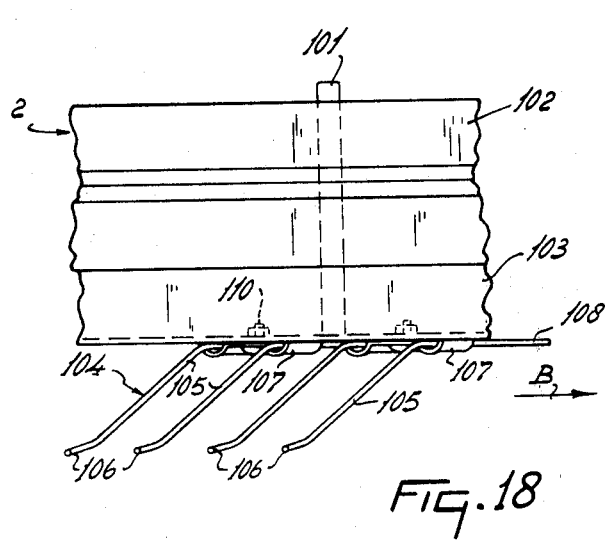

HAYMAKING MACHINES

According to the invention the cropdisplacing means are arranged so that the distance between two corresponding points of two adjacent means, as measured along the circumference, is smaller than the length of the working portion of one of said means.

In this way a rake member is obtained, whose cropdisplacing means can match unevenesses of the ground in a flexible manner and in several directions, without losing their grip on the crop, while the crop is prevented from moving past between the means in an undesirable manner.

For a better understanding of the invention and in order to show how the same may be carried into effect, reference is made by way of example to the accompanying drawings, in which:

FIG. 1 is a plan view of a hay-making machine in accordance with the invention.

FIG. 2 is a plan view of part of the circumference of a rake member associated with the machine.

FIG. 3 is an elevation in the direction of the arrow III in FIG. 2.

FIG. 4 is an elevation taken in the direction of the arrow III in FIG. 2 of a second embodiment of crop-displacing means.

FIG. 5 is an elevation in the direction of the arrow III in FIG. 2 of a third embodiment of the crop-displacing means.

FIG. 6 is a plan view of part of the circumference of a different embodiment of a rake member associated with the machine.

FIG. 7 is an elevation in the direction of the lines VII—VII in FIG. 6.

FIG. 8 is a plan view of part of the circumference of a further embodiment of a rake member associated with the machine.

FIG. 9 is an elevation of crop-displacing means in the direction of the arrow IX in FIG. 8.

FIG. 10 shows a detail of the fastening mode of the crop-displacing means as shown in FIGS. 8 and 9, viewed in a radial direction.

FIG. 11 is a plan view and partly a sectional view of part of the circumference of a further embodiment of a rake member associated with the machine comprising an ejection device.

FIG. 12 is a plan view of part of a rake member associated with the machine in a further embodiment.

FIG. 13 is an elevation in the direction of the arrow XIII in FIG. 12.

FIG. 16 is a sectional view on an enlarged scale taken on the lines XVI—XVI in FIG. 14.

FIG. 17 is a sectional view taken on the lines XVII—XVII in FIG. 16.

FIG. 18 is a side elevation in the direction of the arrow XVIII in FIG. 17 of part of a rake member.

Figure 14:
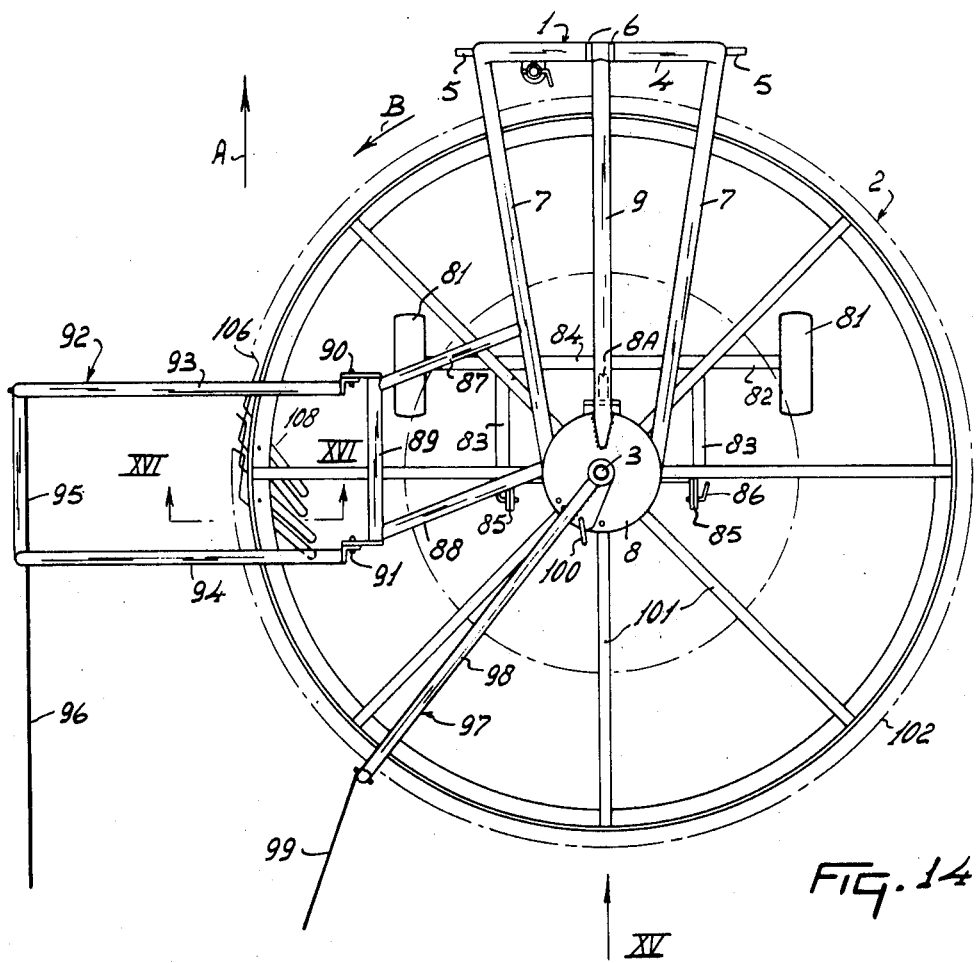
FIG. 14 is a plan view of a further embodiment of the machine in accordance with the invention.

The hay-making machine shown in FIG. 1 comprises a frame 1, in which a rake member 2 is rotatably journalled so as to rotate about an upwardly directed axis of rotation 3, which is inclined upwardly and forwardly, viewed in the direction of travel A or extends, in operation in a substantially vertical direction in accordance with the structural features of the rake member 2 and/or the nature of the crop to the displaced. The frame 1 comprises a trestle 4 in the form of an inverted U, viewed in the direction of travel A. Fastening means 4 are provided at the two free ends on the lower side of the trestle 4 for the attachment to the lower arms of a lifting device of a tractor moving the machine, whereas near the top end of the trestle 4 fastening means 6 are provided for the connection with the top arm of the three-point lifting device of the tractor. Away from the free ends of the trestle 4 supporting tubes 7 extend rearwardly and are arranged, viewed on plan, so that they converge rearwardly. In the elevation of FIG. 1 these supporting tubes 7 together with the trestle 4 form essentially an isosceles triangle, the base of which extends transversely of the direction of movement A at the front of the machine. The rear ends of the two supporting tubes 7 are fastened to a gear box 8, in which the rake member 2 is journalled and from a place on the trestle 4 near the fastening means 6 a supporting tube 9 is inclined rearwardly and downwardly, the rear end of said tube 9 being also secured to the gear box 8. In the elevation shown in FIG. 1 the center line of the supporting tube 9 coincides with the perpendicular of the triangle in the direction of travel A.

To the gear box 8 and, moreover, to the rear ends of the supporting tubes 7 and 9 is secured a transverse beam 10, the length of which slightly excceds the diameter of the rake member 2. The transverse beam 10 is bent over at both ends in the foreward direction and forms two brackets 11 one on each side of the machine, which are orientated in the direction of travel A and which are bent over again at the front towards the trestle 4, so that supports 12 are formed. The brackets 11 are thus located beyond the circumference of the rake member 2 and constitute together with the transverse beam 10 and the supports 12 a protective bracket for preventing undesirable contact with the rake member 2.

Along the geometrical axis of rotation 3 a shaft, which is stationary with respect to the frame 1, is arranged, about which the rake member 2 is adapted to rotate. At the lower end of the stationary shaft, beneath the rake member ground wheels 13 are arranged in mirror-reflection fashion. These ground wheels are located one on each side of the vertical longitudinal plane of symmetry of the machine so that in operation the ground contact points are located in front of a vertical plane transverse of the direction of movement A and going through the point of intersection of the axis of rotation 3 with the ground.

The hub of the rake member 2 has secured to it four spokes 14, which are arranged at an angle of 90° relatively to one another. At the ends of the spokes 14 remote from the hub a supporting ring 15 is arranged, which has the shape of a circle, viewed on plan (FIG. 1).

Along the circumference of the supporting ring 15 a large number of means are arranged for displacing the crop. These means shown in the last-mentioned Figures have the shape of spring steel tines 16, which are arranged in this case along the outer circumference of the supporting ring 16, but which may alternatively be arranged along the inner circumference thereof.

The number of means or tines 15 arranged along the circumference of the ring 16 is so large and hence the relative distance between two adjacent means or tines 16 is so small that in operation no crop can pass in between two adjacent means or tines 16. The distance between two corresponding points of two adjacent means, measured along the circumference is smaller than the length of the working portion of one of the means. The distance between two corresponding points of two adjacent means, measured parallel to the circumference of the supporting ring 15, is preferably smaller than about 70% preferably about 40% of the length of the working portion of one of the means. The correct choice of the relative distance between two adjacent means may be more precisely determined within said limits in accordance with the working conditions of the machine and the nature of the crop to be displaced. Each tine 16 comprises a portion 17 extending downwardly away from its fastening point on the supporting ring 16 and joined by an end portion 18, which is at an angle to the downwardly extending portion 17. In the embodiment shown in FIGs. 2 and 3 the end portion 18 extends parallel to the axis of rotation 3 to the outside. Viewed in a direction parallel to the axis of rotation 3 the end portions 18 extend preferably in a radial direction or, viewed in the direction of rotation B, of the rake member 2, they extend to the rear. In the embodiment shown in FIGS. 2 and 3, viewed from the lower end of the downwardly extending portion, said end portions 18 are inclined downwardly to the outside. Viewed in the direction of rotation B extending portions 17 are inclined away from the fastening points on the ring 15 in downward and rearward direction. The downwardly extending portions 17 (FIG. 2) extend away from their fastening points to the outside so that in operation they are parallel to the surface of a body of revolution about the axis of rotation 3, in this case a cone. Each means 16 is pivotally connected with the supporting ring 15 so as to be pivotable about a pivotal shaft 19, the center line of which extends radially at right angles to the axis of rotation 3. As is shown in FIGS. 2 and 3, said means 16 may in the first place be freely pivotable about the associated pivotal shaft 19 (the two tines shown on the left-hand side of FIGS. 2 and 3), but they may alternatively be resiliently pivotable about the pivotal shaft 19 (the third tine from the left in FIGS. 2 and 3). Coils 20 of the tine 16 surrounding the pivotal shaft 19 are prolonged in the form of a supporting portion 21, the end of the which is passed, at a distance from the pivotal shaft 19, through a hole in the supporting ring 15. In the third place each tine 16 may be partly freely pivotable and partly resiliently pivotable about the pivotal shaft 19 (the tine 16 on the right-hand side of FIGS. 2 and 3) by inserting the bent-over free end of the supporting portion 21 into an elongated slot 22. The slot 22 has the shape of part of a circle, the center of which is located on the center line of the pivotal shaft 19 so that the end of the supporting portion 21 is adapted to reciprocate freely in the slot, whilst in the event of heavier loads on the tine 16 it is held resiliently at one of the ends of the slot 22.

In operation the active or working portion of the means or tine 16 is formed by the length of the downwardly extending portion 17, measured along the tine, plus the length of the adjoining end portion 18.

The aforesaid distance between two corresponding points of two adjacent means 16, measured along the circumference, which distance is smaller than the length of the active portion of one of the means, is designated in FIG. 3 for the sake of clarity by the reference numeral 23.

It should be noted that favourable operational results may be expected from a disposition of the tines 16 in which, viewed in a direction parallel to the axis of rotation 3, the downwardly extending portions 17 of said tines are orientated tangentially in this elevation, so that they extend substantially parallel to the surface of a circle-cylinder about the axis of rotation 3.

In the embodiment shown in FIG. 4 the supporting ring 15 is provided with a plurality of tines 16 constructed, for example, in the form of the tine 16 indicated in FIGS. 2 and 3 as the second tine from the right. Between each pair of successive tines 16 of this type a differently proportioned tine 24 is arranged, which is distinguished from the tine 16 in that the downwardly extending portion 25 may have a length amounting to 50 to 90% of the length of the downwardly extending portion 17 of the tine 16 so that comparatively long and short tines alternate.

In the embodiment shown in FIG. 5 tines 16, fastened in the same manner as the second tine from the right in FIGS. 2 and 3, are provided with plate-shaped parts 27, fastened to the downwardly extending portion 17 of each tine 16 and extending away from the portion 17 in a direction opposite the direction of rotation B. The plate-shaped parts 27 are provided at their front side, viewed in the direction of rotation B, with a collar 28 bent over through 180° and surrounding the downwardly extending portion 17 and serving as a fastening means for the portion 17. The lower side of the plate-shaped portion 27 having the form of a parallelogram in a radial elevation, can thus bear on the end of the bent-over end portion 18 facing the portion 17. The tines 16 of FIGS. 4 and 5 may again be disposed so that the downwardly extending portions 17 and 25 respectively extend parallel to the surface of a circle-cylinder or a cone, while the tines 16 and 24 respectively may be freely or partly freely and resiliently pivotable.

FIGS. 6 and 7 show an embodiment in which the means are formed by groups of tines 29, which are freely pivotable about tangentially orientated shafts. Each group of tines 29, viewed in a direction parallel to the axis of rotation 3, comprises two tines 30 and 31, forming mirror reflections. Each of these tines has a coil 32 surrounding a felly-like supporting ring 33. The supporting ring 33 has a circular sectional area. Each group of tines 29 is therefore freely pivotable about the supporting ring 33 by means of the coils 32. The proximal ends of the coils 32 are interconnected by a tie piece 34, which extends in a tangential direction.

Between the two coils 32, arranged in mirror reflection fashion, a sleeve 35 surrounds the supporting ring 33, to which it can be fastened. This sleeve prevents a group of tines 29 from shifting in a tangential direction. Each tine 30 or 31 extends downwardly away from the associated coil 32 to form upper portions 36 and 37 respectively, which diverge outwardly away from the tie piece 34. Each of the upper portions 36 and 37 then terminates in coils 38 and 39 respectively, located beneath the supporting ring 33. Viewed from the coils 38 and 39, the tines extend towards their free ends parallel to the associated upper portion 36 and 37 (see the elevations in FIGS. 6 and 7) to form tine portions 40 and 41 respectively. Each of these tine portions terminates in end portions 42 and 43 respectively. Viewed in a direction parallel to the axis of rotation 3, the end portions 42 and 43 extend in a radial direction and, viewed in a tangential direction (FIG. 7) they are sharply bent over outwardly with respect to the corresponding tine portions 40 and 41 respectively, said end portions being at a smaller angle to a plane at right angles to the axis of rotation 3 than the upper portions 36 and 37 respectively and the tine portions 40 and 41 respectively. The portions 36, 37 and 40, 41 are parallel to the surface of a cone whose apex is located above the machine. However, the orientation of said portions may alternatively be such that they are parallel to the surface of a circle-cylinder. Through the coils 38 and 39 of all groups of tines 29 is passed one flexible, endless steel wire 44. As an alternative, a nylon rope may be passed through the coils 38 and 39 of all groups of tines 29, said rope being fastened to said coils by a knot. The supporting ring 33 may be formed from four separate parts, which may be secured to one another by bolts 45. This divided supporting ring 33 permits of slipping the groups of tines 29 onto the supporting ring 33 in between each pair of adjacent spokes 14.

In the embodiment shown in FIGS. 8 to 10 means 46 are pivotable about axial pivotal shafts 47. The pivotal shaft 47 are passed through hollow sleeves 48 (FIG. 10), whose center line extends radially and which are rigidly secured to the supporting ring 15. Each pivotal shaft 47 is provided with two rings 49 and 50 rigidly secured thereto on either side of the associated sleeve 48. The distance between the rings 49 and 50 exceeds the length of the sleeve 48, measured in an axial direction. The ring 50 is provided on its side facing the sleeve 48, with two or more lugs 51, which may be received in correspondingly shaped recesses on the lower side of the sleeve 48. Between the lower side of the upper ring 49 and the top side of the sleeve 48 a helical spring 52 serves as a compression spring so that by the pressure of said spring each lug 51 is held in a corresponding recess of the sleeve 48. In an alternative embodiment (not shown) the lug(s) is(are) omitted and the two ends of the helical spring 52 are rigidly secured to the ring 49 and the top side of the sleeve 48 respectively so that the helical spring 52 operates as a torsional spring. The torsional spring is then stretched so that it tends to turn the pivotal shaft 47 (FIG. 8) in the direction of the arrow C.

The tine-shaped means 46 are fastened to the pivotal shaft 47 beneath the ring 50. The means 46 are formed by U-shaped pairs of tines 53 and 54, made from a single length of spring steel wire. Near their portions located between the free ends they are secured to the pivotal shaft 47. Away from the pivotal shaft 47 the tines extend substantially in a tangential direction opposite the direction of rotation B in accordance with the position of the sleeve 48 with respect to the lug 51. From FIG. 9 it appears that the ends of the pairs of tines 53 and 54 extend substantially horizontally with respect to the ground surface and cross the center line of the adjacent pivotal shaft 47. The free end 56 of the lower tine 55 of the pair of tines 54 is bent over radially to the outside. Since the free end of each tine 55 is moreover, bent over slightly in downward direction, this free end bears, in operation, on the ground or it moves at a very short distance above the ground.

The embodiments of the hay-making machine shown in FIGS. 1 to 10 operate as follows. After the machine has been attached to the lifting device of a tractor moving the machine with the aid of the fastening means 5 and 6, the rake member 2 can be driven with the aid of an auxiliary shaft linked to the power take-off of the tractor and to the input shaft 8A of the gear box 8, the rake member 2 rotating in the direction B. The axis of rotation 3 may extend substantially vertically so that the free ends of the end portions 18 of the crop-displacing means 16 are constantly moving at a short distance above the ground, but as an alternative the axis of rotation 3 may be inclined forwardly and upwardly so that the free ends of the end portions 18 of the means 16 are located near the ground over part of their path near the front of the rake member 2, viewed in the direction of travel A, the other part of the path being located at a distance above the ground. The end portions 18 of the means 16 or the end portions 42, 43 of the tines 30, 31 or the end portions 56 of the means 46 engage the crop lying on the ground on the right-hand side, viewed in the direction of travel A in FIG. 1, the crop being carried along by said end portions and by the series of successive downwardly extending portions 17, 36, 37, 40, 41, 53–55 in the direction of rotation B, the last-mentioned portions pushing on the crop in the direction of travel A and carrying it along at the same time in the direction of rotation B to shift the crop aside until it is released on the left-hand side by said series of successive bars and is left in the form of a swath. As a matter of course, the machine may be provided on this left-hand side with a swath board of known type. The function of said portions 17, 36, 37, 40, 41, 53–55, therefore, is essentially a shifting and displacing function, while the relative distance (23 in FIG. 3, but also viewed in an upward direction in FIG. 9) is such that during shifting and displacing of the crop it cannot pass in between two successive or adjacent or superjacent portions of the means to the interior. When the means 16 (FIGS. 2 and 3 on the left-hand side) are freely pivotable by their suspension, the means 17 can smoothly follow the unevennesses of the ground, while the end portions 17 nevertheless engage the crop and carry it along without these means gliding over the crop without effect. In the event of very heavy and dense crop it is useful to suspend the means resiliently at the top side so that the end portion 18 can move upwardly only against a resistive force, while as an intermediate solution a partly freely pivotable and partly resilient suspension may be employed in dependence upon the kind of crop. The crop-displacing means 24 alternating with the means 16 may be desired when the layer of crop is comparatively thick or when a swath has to be worked so that not only closely to the ground but also at a distance above the ground an end portion, in the latter case the end portion 26, is always at hand to engage the crop so that also thick layers as a whole can be displaced, carried around and shifted aside.

FIG. 5 shows an embodiment which is suitable for treating very short crop. In this case the space between two adjacent means is practically entirely filled out by a plate-shaped portion 27, which prevents the very short crop from penetrating in between two adjacent means, while the end portions 18, projecting beneath the plate-shaped portions 27, engage the crop.

In the embodiment shown in FIGS. 6 and 7 the group of tines 29 are adapted to pivot about tangential pivotal shafts so that in operation the end portions 42 and 43 move outwardly under the action of centrifugal force. However, this movement is resiliently limited by the steel wire 44 or an elastic nylon rope so that in operation and when fulfilling the aforesaid functions the groups of tines 29 are capable of matching conditions very elastically in a radial, an axial and a tangential direction. The tines 30 and 31 may furthermore be provided with plate-shaped parts 27 for avoiding penetration of short crop in a radial direction.

In the embodiment shown in FIGs. 8 to 10 the pairs of tines 53 and 54 together with all adjacent and further pairs of tines constitute so to say an elastic fence, which is also capable of fulfilling the function depicted above. The end portions 56 of the lower lines 55 of the lower pairs of tines 54 again engage the crop, while the said "fence" performs the shift in place. By pressing down the pivotal shaft 47 against the tension of the helical spring 52, the pivotal shaft 47 can be adjusted into a different position relative to the sleeve 48, the lug 51 being caused to snap into a further recess in the sleeve 48. When the pivotal shaft 47 is released the helical spring 52 urges the lug 51 into the selected recess so that for example the initially substantially tangetial direction of the tines of the pairs of tines 53 and 54 extend more to the outside after this adjustment. It is thus possible to choose various directions of the tines in accordance with the nature of the crop. If, as an alternative, no lugs 51 are provided and the helical spring 52 serves as a torsional spring, the groups of tines 53 and 54 tend, by centrifugal force, to move outwardly (so that a largecrop-displacing surface is formed) against the tension of the spring 52, which tends to move the tines into a tangential working position. This may be important in the case of thick layers of crop.

It should be noted that, viewed in an axial direction, the end portions 18 and 56 may extend in a radial direction, but, viewed in the direction of rotation B, they may also extend to the rear. The radial orientation of said end portions may be useful in the case of two rake members driven in opposite senses, when the crop has to be tedded, whereas a more rearwardly position may be suitable for raking crop by means of the machine shown in FIG. 1.

In the embodiment shown in FIG. 11 an ejecting member 57 is provided for ejecting the crop at an adjustable place along the circumference of the rake member 2; in this case it is released by blowing. A hub 58, similar to the hub coaxial to the axis of rotation 3 to which the spokes 14 are secured, is prolonged downwardly beneath the plane of rotation of said spokes and is provided at its outer circumference with a plurality of curved blades 59, which have in operation the same rotational speed as the rake member 2 itself. The free ends of the blades 59 of equal lengths described a circular path, viewed in a direction to the axis of rotation 3. Around these blades 59 is arranged a pump-housing 60, partly comprising a housing 61 shaped in the form of a cylindrical sheath, the axis of symmetry of which is eccentric to the axis of rotation 3, but extends parallel to said axis of rotation. The ends of the housing 61 terminate in a wind channel 62 having walls converging towards the circumference of the rake member 2 to form at the end a wind opening 63, the plane of which is tangential to the circumference of the rake member 2. Near the wind opening 63 an adjustable throttle valve 64 is included in the wind channel 62 and is adjustable and fixable in several positions about an axial pivotal shaft. A detailed shape of the ejecting member 57 is shown in FIG. 11. The parts shown in said Figure are closed on the lower and upper sides by walls extending parallel to a plane at right angles to the axis of rotation 3, one of said walls, preferably the upper wall, having one or more apertures located near the axis of rotation 3 for the supply of air to the interior of the housing 60. The whole ejecting member 57 is adapted to turn about the axis of rotation 3 and to be fixed in a plurality of positions by means of a tag 65 secured to the housing 61 and having a hole 66. A part of the stationary rotary shaft located beneath the ejecting member 57 has secured to it a curved adjusting strip 67, which has a portion bent around the axis of symmetry of the housing 61 in the elevation of FIG. 11, said strip having a plurality of holes 68. The wind opening 63 can be set in various positions relative to the circumference of the rake member 2 in a tangential direction and be fixed in position by passing a locking a pin through the hole 66 and one of the holes 68 of the setting strip 67.

In operation the blades 59 are rotating with a speed equal to that of the rake member 2, but in principle this rotational speed may be increased with respect to that of the rake member 2 with the aid of a gear wheel transmission (not shown). The air entering the housing 61, in this embodiment on the top side of the ejecting member 57, is blown in known manner by the blades 59 at a high rate out of the wind channel 62, the air escaping through the wind opening 63, which is located directly on the inner side of the periphery of the rake member 2. The crop sticking to the means 16, 24, 29 or 46 is blown off the means at the area of the wind opening 63 by the air stream emerging at a comparatively high rate. It is thus ensured that the crop is released at a predetermined place along the circumference of the rake member even if the end portions of the means should extend radially or be in forwardly projecting positions with respect to the direction of rotation. By adjusting the throttle valve 64 the rate of emergence of the air can be controlled and, if desired, the air supply can be completely stopped.

In the embodiment shown in FIGS. 12 and 13 the spokes 14 of the rake member 2 are secured to a hub 69, which is adapted to rotate about the stationary axis of rotation 3. Viewed in a radial direction (FIG. 13), the supporting ring 15 is provided here on the lower side with a plurality of notches between which a series of supporting surfaces 70 are formed, which are integral with the supporting ring 15. Viewed in a radial direction, at the area of the supporting surfaces 70 a plurality of means 71 are provided in the form of an elongated plate-shaped strip 72 having the shape of a rectangle, whose long side extends in an axial direction. Each plateshaped strip 72 is made from comparatively thin sheet material of steel, aluminium or synthetic resin. Each strip 72 has an arcuated surface in the no-load state. The upper part 73 of each strip 72 is flat and engages the ring 15 or the corresponding supporting surface 70 and is rigidly secured to the supporting ring 15 by means of a bolt or a nail 74. The portion of the strip 72 located beneath the supporting ring 15 or the supporting surface 70 is also flat, but it extends parallel to a plane at an angle to the plane to which the upper part 73 of the same strip 72 is parallel. The arcuation of the strip 72 formed by a depression of the material is located near the lower side of the corresponding supporting face 70. The extent of arcuation of each strip 72 is shown in FIG. 12. Viewed in the direction of rotation B, the lower part 75 extends to the rear, but this part may alternatively extend in an almost radial or completely radial direction. To the lower part 75 of each strip 72 is fastened an eyelet 76 at a place located on the rear side of the part 75, viewed in the direction of rotation B, that is to say behind a plane going through the center line of the bolt or nail 74 and through the axis of rotation 3. To each eyelet 76 is fastened a control-wire 77, which is secured to the hub 69 by its end remote from the strip 72. The flexible control-wires 77 (for example steel wire or nylon rope) are located parallel to a plane at right angles to the axis of rotation 3. To the stationary axis of rotation 3 is secured a radial extension arm 78, whose end remote from the axis of rotation 3 is located, viewed in an axial direction, at a place located approximately midway the axis of rotation 3 and the supporting ring 15. To this end of the extension arm 78 is secured a tangentially extending support 79, which holds a rotatable control-roller 80 near its free end. The rotary shaft of the freely rotatable control-roller 80 extends radially and at right angles to the axis of rotation 3. Viewed upwardly parallel to the axis of rotation 3, the upper points of the control-roller 80 are located at a higher level than the neighbouring parts of the control-wires 77, viewed in a radial direction. The rotary shaft of the control-roller 80 is adjustable both in a tangential and an axial direction in a manner not shown and can be fixed in a plurality of positions.

The hay-making machine shown in FIGs. 12 and 13 operates as follows. The means 71 constitute an endless row of successive crop-displacing members spaced apart by a distance such that measured along the circumference the space between two corresponding points of two adjacent means is smaller than the length of the working portion of one of the means, the working portion being formed that portion of the plate-shaped flexible strip 72 which projects beneath the lower edge of the corresponding supporting face 70. The lower sides of the strips 72 are moving at a short distance above the ground and are capable of deflecting elastically when encountering unevennesses of the ground, after which deflection they can immediately regain their initial positions. Like in the preceding embodiments the means 71 can elastically match the ground both in radial, a tangential and an axial direction. The strips 72 engage the layer of crop on one side and displace the crop accumulating in front of the dragging strips forwardly and tangentially to the other side of the rake member. Owing to the said small space between the strips the crop cannot pass in between them, even if they extend rearwardly, with respect to the direction of rotation, the crop remains in the cavity formed in front of said strips up to the point where the crop is released on one side of the machine. The control-roller 80 serves to improve the release, if necessary. Therefore, the control-roller 80 is arranged, viewed in the direction of travel, at a place determinative of the area of release. Since the upper points of the control-roller 80, viewed in axial direction, are located at higher level than the rotating control-wires 77 each control-wire 77 will be urged upwardly when passing along the control-roller 80. When one of the control-wires 77 is in contact with the top side of the control-roller 80, the local portion of the control-wire 77 moves upwardly so that the rectilinear distance between the fastening points of the control-wire 77 is shortened, since the shape of the wire 77 deviates from a straight line. This is possible by a displacement of the eyelet 76, so that the lower part 75 of the strip 72 is exposed to torsional effect, which is shown in FIGS. 12 and 13 for one of the strips 72; viewed in an axial direction the lower part of the strip 72 will temporarily extend in a tangential direction so that the crop is released. Since in the unloaded state the arcuated shape of the strip 72 is the normal shape, the strip 72 will jump back into its normal state after its passage along the control-roller 80 so that the lower part 75 regains its rearwardly directed position, with respect to the direction of rotation.

The machine shown in FIG. 14 comprises parts whose shape, arrangement and function correspond with those of parts shown in FIG. 1 by the same reference numerals.

In known manner the rake member 2 is supported on the lower side from a set of ground wheels 81 interconnected by an axle 82, which is connected by means of two upwardly extending rods 83 located one on each side of the gear box 8 with a shaft 84, which is rigidly secured midway its length to the lower side of the gear box 8. Near the two ends of the shaft 84 two sector-shaped plates 85 are provided, one of which is rigidly secured to the shaft 84, whereas the other plate is connected with the rod 83 so as to be pivotable about the shaft 84. The plates have near their circumferences a plurality of bores for passing a locking pin 86. In this way the rake member 2 can be adjusted in a direction of height, while the slope of the rake member to the ground is variable and can be fixed in a plurality of positions.

Figure 15:
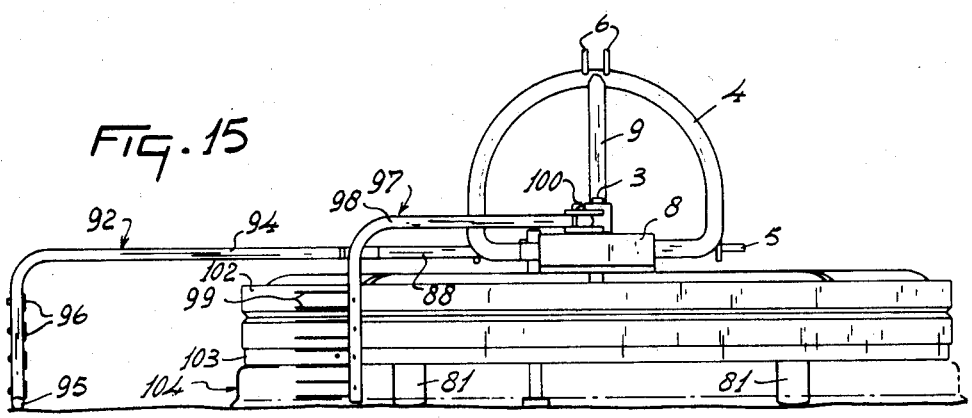
FIG. 15 is an elevation in the direction of the arrow XV in FIG. 14.

To the side of the left-hand supporting tube 7, viewed in the direction of travel A, are welded two supporting tubes 87 and 88, which extend at least substantially horizontally and parallel to one another and, viewed in the direction of travel A, they are inclined to the rear and are at an angle to the direction of travel A of about 70°. The tubes 87 and 88 thus extend in the direction of the circumference of the rake member 2 for about 55% of the radius of the rake member, where the two ends of the tubes are interconnected by means of a tubular supporting beam 89, which is also horizontal and parallel to the direction of travel A. With the aid of pivotal shafts 90 and 91 a swath-forming member 92 is hinged to the supporting beam 89. This swath-forming member 92 is held by two tubular extension arms 93 and 94, which extend horizontally and transversely of the direction of travel A to the outside at a distance from the axis of rotation 3 equal to about 170% of the radius of the rake member 2. At this point the extension arms 93 and 94 are bent down through 90° (FIG. 15) and near the ground surface they terminate in a tubular intermediate piece 95, which is also parallel to the direction of travel A. To the downwardly extending parts of the extension arms 93 and 94 and to the intermediate piece 95 are secured a plurality-preferably four-of flexible rods 96 one beneath the other; these rods extend horizontally and parallel to the direction of travel A. These rods preferably have a length of about 140% of the radius of the rake member 2. Viewed on plan in the direction of travel A, the rearmost free ends of the rods 96 are located in the same plane as the rear side of the rake member 2. The top side of the gear box 8 supports a second swath-forming member 97. This member 97 is formed by a tubular portion 98 pivotally connected on the one hand with the gear box 8, the pivotal axis coinciding with the axis of rotation 3. Beyond the circumference of the rake member 2 the portion 98 is bent over downwardly through 90° and terminates just above the ground surface. To this downwardly extending portion are secured a plurality of horizontal spring steel tines 99, preferably eight, the length of which is about 50% of the radius of the rake member 2. Viewed with respect to the portion 98 and in the direction of travel A the tines 99 are bent over rearwardly and the angle between the portion 98 and the tines 99 is about 160°. The position of the swath-forming member 97 is adjustable and fixable with respect to the rake member and the swath-forming member 92 with the aid of a fixing mechanism 100 located on the top side of the gear box 8.

The rake member 2 comprises eight, preferably radial, tubular spokes 101, secured on the inner side to the hub of the rake member 2 and near the circumference of the rake member the spokes are bent down through about 90°. The length of the downwardly bent portion of a spoke 101 is about 65% of the height of the rake member 2. The circumference of the rake member 2 is provided with a circular, upright, plate-shaped rim 102, which is welded midway the height at the inwardly extending V-shaped profile to the spokes 101 and comprises an inwardly bent-over portion on the upper and lower sides. To the lower bent-over portion of the rim 102 is welded a felly 103, whose radial section (FIG. 16) has the shape of an L; on account of its function it may be heavier than the rim 102. The longer side of said felly 103 may form a prolongation of the rim 102 and the inner short limb of the L is fastened to the lower end of the spokes 101. The upper portion of the rim 101 is at a distance of at the most 60 cms and preferably about 40 cms above the ground surface and the short limb of the felly 103 is located at a distance of 10 to 30 cms, preferably about 15 cms above the ground level. The height of the wall formed by the rim 102 and the felly 103 is, therefore, preferably about 25 cms. The diameter of said wall, which corresponds substantially with the diameter of the rake member, is 1.5 to 4.0 ms, preferably about 2.5 ms.

To the lower side of the inwardly extending portion of the rim 103 are pivotally secured a great number of groups of tines 104, which are preferably made of spring steel of a diameter of 4 to 7 mms, preferably 5 to 6 mms. The groups of tines 104 are composed so that two tines can be made from a single length of spring steel wire. The rake member 2 comprises 60 to 100, preferably about 80 tines. Each group of tines 104 comprises a plurality of substantially tangential tine portions 105, which cross the axis of rotation 3 at an angle of 45°. Away from the felly 103 said portion extends obliquely downwards and, viewed in the direction of rotation, to the rear (FIG. 18). Near the ground it terminates in an end-portion 106, which is at least substantially horizontal and is at an angle of about 45° to the associated radial line in rearward direction, viewed in the direction of rotation B. The groups of tines 104 are secured to the short limb of the felly 103 by means of a bracket 107 so that the tines are capable of turning with respect to the felly 103. Across the bracket 107 the tine portion 105 extends inwardly and terminates in a portion 108, which operates as a torsional rod and which like the tines is at an acute angle to the associated radial line. At a given distance therefrom, viewed in a direction parallel to the axis of rotation 3, it is bent back through 180° towards the felly 103. Thus a portion 109 of a torsional rod is formed, which is fastened by means of a bolt-and-nut joint 110 to the felly 95. The portions located inside the felly 95 extend parallel to a plane at right angles to the axis of rotation. Away from the joint 110 the portion 109 is bent inwardly through 180° to form a second loop similar to the portions 109 and 108 in arranged mirror-reflection fashion, the portions of said loop also being parallel to a horizontal plane. Through the sleeve formed by the bracket 107 and the felly 103 the loop terminates in the other portions 105 and 106 of the group of tines 104. In this way each tine of the rake member 2 is located at a distance from the other tine, measured along the circumference, which is smaller than the length of the working portion of one of the tines, said distance being, for example, less than about 70% of said length, preferably about 40%. The haymaking machine shown in FIG. 14 operates as follows:

The machine is driven by an auxiliary shaft coupled with the power take-off shaft of the tractor and connected with the input shaft 8A of the gear box 8 so that the rake member 2 is caused to rotate in the direction of the arrow B. The crop will thus be displaced forwardly and sideways in the direction B so that the crop arrives at the rods 96 of the swath-forming member 92 and since the member 92 moves, in operation, in the direction of travel A, the side of the swath to be formed remote from the member 92 comes into contact with the tines 99 of the swath-forming member 97. Moreover, the swath-forming member 97 collects any crop carried along too far or released too late and joins it to the swath.

By means of the mechanism 100 the position of the member 97 can be varied so that the shape of the swath can be controlled. The member 92 is not adjustable. By turning it upwardly about the pivotal shafts 90 and 91 this member can be put out of operation.

In operation the various groups of tines 104 are capable of deflecting resiliently not only in a radial and a tangential direction but also in an axial direction. The inner portions 108 and 109 of a group of tines 104 serve as torsional rods. Also owing to the free pivotal mobility of the tines in the bracket 107 on the felly 103 the tines are capable of deflecting rapidly and effectively. The felly 103 protects the tines from damage by the encounter of unevennesses of the ground or obstacles. By turning upwardly through about 50° or more the tines can deflect to or even behind the felly 103, while the felly 103 itself as a "buffer" absorbs the energy of the collision. The felly 103 thus prevents breakdown of the tines. Under the action of collisions the tines cannot deflect excessively so that the spring steel of the tines will maintain its resilience in the region of elasticity of the tension diagram of this material. Thee large number of tines (80 tines) ensures a satisfactory raking effect of the rake member 2. Since the tines are at an acute angle to the associated radial lines and, viewed in the direction of rotation B, the tines are guided to the rear in outward direction through the bracket 107, an effective deflection of the tines is ensured, whereas nevertheless the ends of the tines remain most closely to the ground. Crop thrown up directly or by the tines is delivered sideways by the rim 102 and the felly 103. The smooth, closed surface of said wall portions ensures that no crop will stick near the circumference of the rake member. The felly 103 and the rim 102 have in the first place the function to remove crop to the side of the rake member. The crop is picked up partly by the tines from the ground and passed to the felly 103 and the rim 102 and the higher part of the layer and the heavier crop is picked directly by the felly and the rim. This construction has the advantage that the tines may be of small weight and can, therefore be flexible without the risk of a breakage of the tines also owing to the crop displacing means in the form of the "buffer" effect of the felly 103.

It should be noted that the tines 104 can be provided with the plate-shaped parts 27 (FIG. 5) or strips 72 (FIG. 13).

Figure 19:
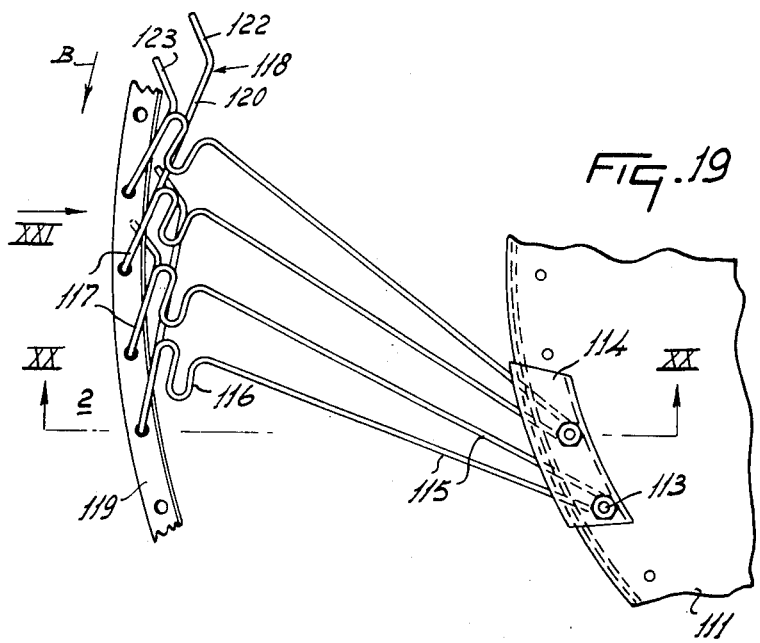
FIG. 19 is a plan view of part of a further embodiment of a rake member.
Figure 20:
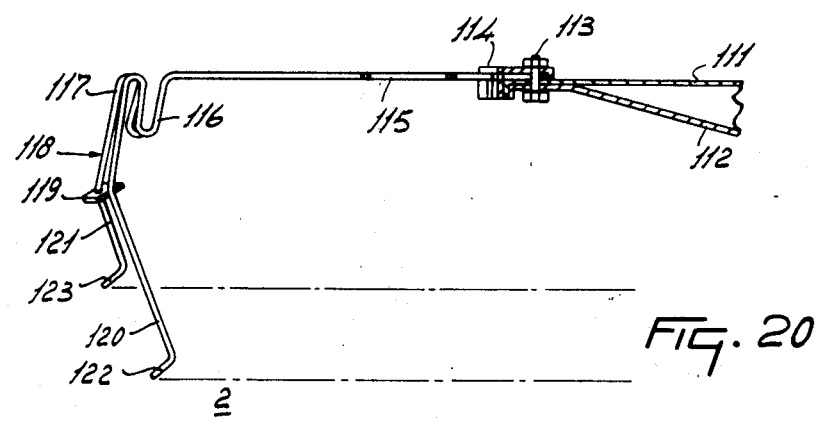
FIG. 20 is a sectional view taken on the lines XX—XX in FIG. 19.
Figure 21:
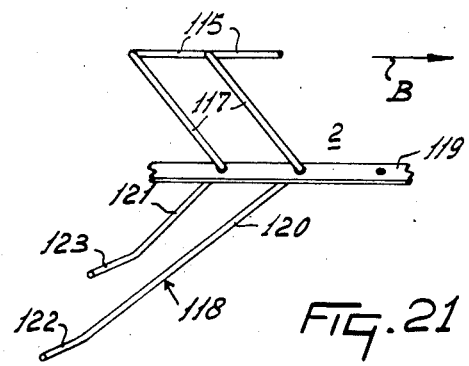
FIG. 21 is a side elevation in the direction of the arrow XXI in FIG. 19.

A further embodiment of the rake member 2, which may be successfully employed in the machine in accordance with the invention, is shown in FIGS. 19, 20 and 21. The hub of the rake member is provided with a circular disc 111 at right angles to the axis of rotation 3 of the rake member and a circular disc 112 extending parallel to a plane intersecting the axis of rotation 3 at an angle of about 105°. The discs 111 and 112 extend outwardly over about half the radius of the rake member, where the two discs are clamped together by means of bolts 113. By means of an annular clamping piece 114 and the bolts 113 a plurality of spring steel spokes-here 115-are clamped tight to the upper side of the disc 111, the spokes being at an angle of about 45° to the associated radial line and viewed in the direction of rotation B they extend rearwardly to the outside. The spokes are bent over preferably at the area of the bolts 113 through 180°, viewed in a direction parallel to the axis of rotation so that two spokes 115 may be made from a single length of steel wire. The spokes 115, arranged at equal intervals from one another, extend outwardly at right angles to the axis of rotation. Measured along the circumference of the rake member, the relative distance is about 10 cms and the diameter of the rake member is about 2.0 ms so that near the circumference of the rake member, measured in a plane at right angles to the axis of rotation, is about 4% of the diameter of the rake member. The spokes 115 are bent over near the outer side of the rake member, viewed in a tangential direction through about 100° in downward direction and, viewed in a radial direction and in the direction of rotation B, through about 35° in the forward direction and they terminate in a loop 116. The loop 116 is formed by the bend of the wire through 180° at about 20% of the height of the rake member, the wire extending, viewed in a tangential direction, parallel to the downwardly extending portion, while it extends upwardly over a height which corresponds approximately with the height of the spokes 115 with respect to the ground surface (FIG. 20). At the point, viewed in a tangential direction, the spring steel wire is again bent down through about 180° parallel to the downwardly extending portions of the loop 116 to form a rod-like portion 117. At about 40% of the height of the rake member the portions 117 are interconnected by means of a felly-like rim 119. Beneath the ring 119, viewed in a radial direction (FIG. 21) the portions 117 are bent through an angle of about 90° to the wear, viewed in the direction of rotation B, where they terminate in a tine portion 120 and 121 of a group of tines 118. The portions 120 and 121 are located in alternating positions on the circumference of the rake member. The portions 120 and 121 are bent over inwardly towards the hub of the rake member and viewed in a tangential direction they cross the axis of rotation at an angle of 70°. The lengths of the portions 120 and 121 is different: the portion 120 are prolonged to just above the ground surface and the length of the portion 121 is about 50% of that of the portion 120. Near the ground the portion 120 of the group of tines 118 terminates in a working tine end 122, which viewed in a tangential direction crosses the axis of rotation at an angle of about 50°, while the tine end 122 at an angle of about 55° to the corresponding radial line of the rake member, viewed in the direction of rotation B to extend rearwardly. In a similar manner the tine end 123 is formed at the lower end of the portion 121. The tine ends 122 and 123 are located, viewed in the elevation of FIG. 21, wholly or partly one above the other. Since the portions 120 and 121 extend inwardly and the length of the tine ends 122 and 123 is fairly small, the group of tines 118 do not hardly extend beyond the circumference of the rake member 2 in operation.

The embodiment of the rake member shown in FIGS. 19 to 21 operates as follows.

The more flexible tine portions 120 and 121 and the end portions 122 and 123 of each group of tines 118, which are located beneath the felly-like ring 119, engage the crop lying immediately on the ground and the crop just lying above the ground and carry it along, whereas the more rigid rod-like portions 117 mainly serve as removing means.

The rod-like portions 117 are inclined downwardly and forwardly, viewed in the direction of rotation B and viewed in a tangential direction, the portions extend away from the ring 119 in upward and inward directions. With this disposition the crop creeps upwardly along the portions 117 owing to the upward speed. also owing to the large number of portions 117 a large conveying surface is obtained. The loop 116, whose downwardly extending portions are approximately parallel to the portions 117, constitutes an additional supporting face for the crop and prevents the crop from moving further inwardly. The crop bearing on the loop 116 is moved owing to the disposition of the loop during the rotation of the rake member in upward direction and to the outer side of the rake member.

The tine portions 120 and 121 join from the ring 119 the portions 118 and, viewed in the direction of rotation B they are inclined downwardly and rearwardly, whereas viewed in a tangential direction these portions extend away from the ring 119 downwardly and inwardly. The end portions 122 and 123 are also inclined downwardly and rearwardly but from top to bottom they extend also outwardly. In this manner "cavities" are formed between the portions 120–122 and 121–123, the "cavity" 120–121 being located at a lower level and further to the interior, whereas the "cavity" 121–123 is at a higher level and further to the outside. The shape of these "cavities" and the regular distribution thereof along the circumference of the rake member provide a satisfactory operation since the crop is effectively picked up and is not prematurely released.

It should be noted that the vulnerable tine ends 122 and 123 move, in operation not outside or hardly outside the circumference of the rake member so that these tine ends are protected from damage.

The movement of the portions 118 may result partly in a bending torque and partly in a torsional torque and partly in a combination of both torques. The bending of the tines in the rake member may be produced at the encounter of heavy crop, unevennesses of the ground or obstacles, the tine portion 120 or 121 then moving mainly upwardly. In the construction according to the invention the rigidity required for compensating for this movement is obtained not only by the rigidity of the spoke 115 achieved by means of the ring 119 but also by the bending resistance of the loop 116. The torsion of the spoke 115 may particularly be due to the mainly inward deflection of the tine under the action of the forward movement of the machine. The spoke 115 is thus subjected to torsional effect, but its own rigidity has a compensating effect on this torsional effect.

Owing to the felly-like ring 119 which interconnects the tines and rods, moreover, owing to the sloping position of the rake member to the ground surface the aforesaid movement of only a few tines will be transferred to the further portions of the rake member so that this movement is resiliently damped under the action of each rod 117, the loop 116 and the spokes 115 and the tine returns into its working position.

It should be noted that the loop 116 serves not only to form a supporting surface for the crop and for improving the flexibility of the tines but also contributes to the delivery of the crop. At the instant when the tine releases the crop, the loop starts vibrating. These vibrations assist in releasing the crop.

In the aforesaid manner the tines will practically constantly maintain a satisfactory working position even under difficult operational conditions. It is very important that the flexibility of the tines required for ensuring a satisfactory raking operation is obtained by including the spoke 115, the rod-like portion 117 and the loop 116, which portions are integral with the tine.

Like the tines 104 (FIG. 16) the tines 118 can be provided with plate-shaped parts or strips at the portions 120 or 121.

It will be evident that the use of rake members according to the invention is not restricted to machines having one rake member, but that it is equally important for machines having more rake members, for example, two rake members driven in the same directions or two rake members rotating in opposite senses, the machines having or not having swath-forming members.

The invention is not restricted to the statement given above and/or in the following Claims, but also relates to the details of the Figures whether described oir not described.

What we claim is:

1. A hay-making machine comprising a frame and at least one rake member supported on said frame, said rake member being rotatable about an upwardly extending axis and having an outer circumference with a plurality of elongated crop working elements located adjacent said circumference around the perimeter of same, said elements each having an outer crop working portion, a control member on said rake member and said control member being operatively associated with said elongated elements to remove crop from said elements at a preselected location with respect to said circumference during the rotation of said rake member, driving means connected to said rake member to rotate same, said elements having tortionally deformable working surfaces and said control member being connected to said elements to deform said surfaces during operation.

2. A hay-making machine as claim in claim 1, wherein said control member comprises flexible wire means.

3. a hay-making machine as claimed in claim 1, wherein coupling means on said frame is connectable to the three point lift of a prime mover.

4. A hay-making machine comprising a frame and at least one rake member supported on said frame, said rake member being rotatable about an upwardly extending axis and having an outer circumference with a plurality of elongated crop working elements located adjacent said circumference around the perimeter of same, said elements each having an outer crop working portion, a control member on said rake member and said control memeber being operatively associated with said elongated elements to remove crop from said elements at a preselected location with respect to said circumference during the rotation of said rake member, driving means connected to said rake member to rotate same, said control member including a central hub and blower in a housing adjacent said hub, an exit channel on said housing directed outwardly to dispense an air stream.

5. A hay-making machine as claimed in claim 4, wherein said housing has adjusting means to change the direction of said channel.

6. A hay-making machine comprising a frame and at least one rake member supported on said frame, said rake member being rotatable about an upwardly extending axis and having an outer circumference and a plurality of tine means supported on said rake member around said circumference, a tine supporting member comprising an upwardly extending circular and rigid supporting rim being rotatable on said frame and defining said circumference, said rim having a lower side and deflectable tines being secured to said lower side, tines having ends that extend rearwardly with respect to the normal direction of rotation of said rim and said ends being connected to torsional portions that are pivotably mounted on the rim.

7. A hay-making machine comprising a frame and at least one rake member supported on said frame, said rake member being rotatable about an upwardly extending axis and having an outer circumference with a plurality of elongated crop working elements located adjacent wall-like portions of said circumference, said crop working elements extending downwardly from said wall-like portions, said elements being tines that have working ends attached to portions that extend substantially tangentially with respect to said circumference, the ends of said tines extending rearwardly with respect to the normal direction of rotation of said member and said portions being positioned closely adjacent one another to form a wall-like surface, whereby crop raked by said ends are supported by said portions during operation.

8. A hay-making machine as claimed in claim 7, wherein two adjacent crop working tines are resiliently interconnected and pivotable through at least one torsional rod connection having a rectilinear rod portion that crosses said upwardly extending axis substantially right angles.

9. A hay-making machine as claimed in claim 7, wherein said portions are upwardly direction rod-like portions of tines, said portions being extensions of tine ends and said portions being inclined rearwardly relative to the direction of normal rotation of said rake member.

10. A hay-making machine comprising a frame at least one rake member supported on said frame, said rake member being rotatable about an upwardly extending axis and having an outer circular supporting member with a plurality of elongated crop working elements located around the circumference of said supporting member, said elements being mounted in groups positioned adjacent one another and the elements of each group being resiliently interconnected to pivot with respect to one another through at least one torsional rod having at least one rectilinear portion that figuratively crosses said axis ear portion that figuratively crosses said axis said element extending downwardly towards the ground from said circumference and having ends that are deflectable simultaneously in radial and axial directions, said ends being movable to protected positions behind said supporting member.

11. A hay-making machine as claimed in claim 10, wherein each of elements is resiliently and pivotably connected to said supporting member through two torsional rods.

12. A hay-making machine as claimed in claim 10, wherein a plurality of crop removing members is mounted on said machine at a distance of less than about 60 cms above said rectilinear portion and the latter is located at the lower side of said rake member.

13. A hay-making machine as claimed in claim 12, wherein the lower side of said supporting member is located at a distance of 10 to 30 cms above a plane extending at right angles to said axis and passing through said lower side of the rake member.

14. A hay-making machine as claimed in claim 10, wherein the diameter of said rake member is about 1.5–3.0 ms.

15. A hay-making machine as claimed in claim 10, wherein said rake member comprises 60 to 100 crop working elements and said elements are tines.

16. A hay-making machine as claimed in claim 15, wherein crop removing members comprised of spring steel rods are supported on said rake member adjacent said tines.

17. A hay-making machine as claimed in claim 10, wherein said crop removing members are connected to a central hub to present a greater resistance to deformation than said tines.

18. A hay-making machine as claimed in claim 17, wherein said tines are located below said supporting member, said crop removing members being located above the supporting member and extending rearwardly away from a felly of said rake member, with respect to the normal direction of rotation.

19. A hay-making machine as claim in claim 18, wherein said crop removing members extend parallel to an immaginary conical surface, the apex of which is located above said rake member on its axis of rotation.

20. A hay-making machine as claimed in claim 19, wherein said crop removing members are associated with said hub with at least one downwardly extending loop of spring steel.

21. A hay-making machine as claimed in claim 15, wherein the distance between two adjacent tines, measured along the circumference of said rake member in a plane at right angles to its axis of rotation, is 2 to 10% of the diameter of said rake member.

22. A hay-making machine as claimed in claim 15, wherein the distance between two adjacent tines, measured along the circumference of said rake member in a plane at right angles to said axis, is about 10 cm.

23. A hay-making machine comprising a frame and at least one rake member supported on said frame, said rake member being rotatable about an upwardly extending axis and having felly means that comprises an outer circumference with a plurality of elongated crop working elements located adjacent said circumference around the perimeter of same, said elements being mounted on pivot means supported by said felly means and said elements being pivotable about axis that are substantially tangential with respect to said circumference, each element having an outer crop working portion, the distance between the working portions of all adjacent elements as measured along said circumference, being less than the length of a working portion of one crop working element, said working portion extending downwardly to an end portion thereof.

24. A hay-making machine as claimed in claim 23, wherein said distance between the two adjacent elements is less than about 70% of the length of the working portion of said one element.

25. A hay-making machine as claimed in claim 23, wherein said elements are pivotable about corresponding substantially radial pivotal shafts on said felly means.

26. A hay-making machine as claimed in claim 23, wherein a stop on said rake member limits the pivotal movements of said elements.

27. A hay-making machine as claimed in claim 23, wherein said elements each have an end portion that extends outwardly.

28. A hay-making machine as claimed in claim 23, wherein each element has a downwardly extending portion and, viewed in a radial direction, an end portion that intersects said downwardly extending portion of an adjacent element.

29. A hay-making machine as claimed in claim 23, wherein said elements are tines and at least one of said tines has a shorter working portion than adjacent tines.

30. A hay-making machine comprising a frame and at least one rake member supported on said frame, said rake member being rotatable about an upwardly extending axis and having felly means that comprises an outer circumference with a plurality of elongated crop working elements located adjacent said circumference around the perimeter of same, said elements being pivotably connected on supports attached to said felly means mounted to pivot substantially axially with respect to said upwardly extending axis, each element having an outer crop working portion, the distance between the working portions of all adjacent elements as measured along said circumference, being less than the length of a working portion of one crop working element, said working portion extending downwardly to an end portion thereof.

31. A hay-making machine comprising a frame and at least one rake member supported on said frame, said rake member being rotatable about an upwardly extending axis and having felly means that comprises an outer circumference with a plurality of elongated crop working elements located adjacent said circumference around the perimeter of same, said elements being connected on supports attached to said felly means and pivotable thereon, said elements being interconnected to one another in a tangential direction by interconnection means, each element having an outer crop working portion, the distance between the working portions of all adjacent elements as measured along said circumference, being less than the length of a working portion of one crop working element, said working portion extending downwardly to an end portion thereof.

32. A hay-making machine as claimed in claim 31, wherein said interconnection means is flexible.

33. A hay-making machine comprising a frame and at least one rake member supported on said frame, said member being rotatable about an upwardly extending axis and having an outer circumference with a plurality of crop working elements attached thereto and positioned around said axis during operation of said rake member, said elements having working lengths comprised of flexible sheet strips that extend downwardly from said circumference, said strips substantially forming an elastic wall around said circumference, at least a portion of said strips comprising surfaces that are tangential to said circumference, the distances between adjacent strips being less than the lengths of said elements.

34. A hay-making machine as claimed in claim 33, wherein each element is an elongated strip which extends downwardly from a supporting surface on felly means of said rake member.

35. A hay-making machine as claimed in claim 34, wherein the top of said strip is fastened and clamped tightly to said felly means.

36. A hay-making machine as claimed in claim 35, wherein said strip is configured, whereby, with respect to a direction parallel to said axis, said strip extends tangentially adjacent its top and outwardly adjacent the bottom thereof.

37. A hay-making machine as claimed in claim 33, wherein above said elements, crop removing members are positioned, said removing members being separated from said elements by a supporting member located above said elements.

38. A hay-making machine as claimed in claim 34, wherein said elements are flexible and mounted on a felly, said rake member having a central hub with wires interconnecting said elements to said hub, a control roller being mounted to contact said wires sequentially and turn said elements.

39. A hay-making machine comprising a frame and at least one rake member supported on said frame, said rake member being rotatable about an upwardly extending axis and having an outer circumference and a plurality of tine means on a supporting member that extends around said circumference and said tine means having ends that extend downwardly from the supporting member, at least one generally circular wall-shaped crop removing means positioned above said supporting member and being substantially contiguous with and generally in line with said supporting member, said removing means having at least one upwardly extending surface and said ends being located closely adjacent one another and being positioned to work crop around said circumference.

40. A hay-making machine as claim in claim 39, wherein elongated tines of said tine means are directly fastened to the lower side of said supporting member and extend rearwardly with respect to the normal direction of rotation of said rake member.

41. A hay-making machine as claimed in claim 34, wherein said crop removing means includes at least one wall-shaped portion and said supporting member is a further wall-shaped portion, said tine means including tine elements that are pivotably mounted on said supporting member.

42. A hay-making machine as claim in claim 41, wherein at least one of said wall shaped portions is a closed circular rim.

43. A hay-making machine as claimed in claim 42 wherein the lower side of said rim is a felly-like circular supporting member.

44. A hay-making machine as claimed in claim 42, wherein said elements have ends that extend rearwardly with respect to the normal direction of rotation, said ends being deflectable to protected positions behind said rim.

* * * * *